| United States Patent [19] | [11] Patent Number: 4,911,865 |
|---|---|
| Heggie et al. | [45] Date of Patent: Mar. 27, 1990 |

[54] PROCESS OF PREPARATION OF NOVEL RHODIUM HYDROGENATION CATALYSTS

[75] Inventors: William Heggie, Barreiro; Philip R. Page, Sintra; Ivan Villax, Lisboa Codex, all of Portugal; Indira Ghatak, London; Michael Hursthouse, Essex, both of England

[73] Assignee: Plurichemie Anstalt, Liechtenstein, Liechtenstein

[21] Appl. No.: 322,176

[22] Filed: Mar. 13, 1989

Related U.S. Application Data

[62] Division of Ser. No. 50,932, May 15, 1987, Pat. No. 4,857,235.

[30] Foreign Application Priority Data

Mar. 25, 1987 [PT] Portugal ................................... 76061

[51] Int. Cl.$^4$ .................... C07B 00/00; C07C 103/19; B01J 31/24
[52] U.S. Cl. .................................... 552/207; 502/166; 556/21
[58] Field of Search ...................... 502/166; 260/351.5, 260/690; 556/21

[56] References Cited

U.S. PATENT DOCUMENTS

| 3,463,830 | 8/1969 | Dunning et al. ...................... 502/155 |
|---|---|---|
| 3,755,194 | 8/1973 | Avilou et al. ........................ 502/155 |
| 3,849,491 | 11/1974 | Villax ................................ 260/351.5 |
| 3,956,177 | 5/1976 | Zuech ................................ 502/155 |
| 3,962,131 | 6/1976 | Faubl et al. ........................ 502/166 |
| 4,001,321 | 1/1977 | Faubl ................................ 260/351.5 |
| 4,031,137 | 6/1977 | Schmitt, Jr. et al. ............ 260/351.3 |
| 4,207,258 | 6/1980 | Broggi et al. ................... 260/429 R |
| 4,500,458 | 2/1985 | Villax et al. ..................... 260/351.5 |
| 4,550,096 | 10/1985 | Page et al. ........................... 502/166 |

FOREIGN PATENT DOCUMENTS

| 0668581 | 8/1963 | Canada ............................. 260/351.5 |
|---|---|---|
| 0086046 | 8/1983 | European Pat. Off. ............ 502/162 |
| 2136621 | 9/1972 | Fed. Rep. of Germany ...... 502/166 |
| 7401340 | 1/1974 | Netherlands ..................... 260/351.5 |

*Primary Examiner*—Richard L. Raymond
*Assistant Examiner*—Raymond Covington
*Attorney, Agent, or Firm*—Ostrolenk, Faber, Gerb & Soffen

[57] ABSTRACT

The present invention refers to complexes prepared by reacting rhodium trinitrate with a suitable hydrazine and a suitable tertiary phosphine, more specifically to the compounds di($\mu$-hydrazine-$N^1$:$N^2$)-bis[bis(triphenylphosphine)rhodium (I)]dinitrate and $\mu$-3-carbopentazane-$N^1$, $N^4$:$N^2$, $N^5$-bis[bis(triphenylphosphine)rhodium (I)]dinitrate, which are homogenous hydrogenation catalysts and their application in the hydrogenation of the exocyclic methylene group of acid addition salts of 6-demethyl-6-deoxy-6-methylene-5-hydroxytetracycline (methacycline) to prepare $\alpha$-6-deoxy-5-hydroxy-tetracycline (doxycycline).

13 Claims, No Drawings

PROCESS OF PREPARATION OF NOVEL RHODIUM HYDROGENATION CATALYSTS

This is a division of application Ser. No. 050,932, filed May 15, 1987 now U.S. Pat. No. 4,857,235.

The present invention refers to complexes prepared by reacting rhodium trinitrate with a suitable hydrazine and a suitable tertiary phosphine, more specifically to the compounds di($\mu$-hydrazine-$N^1$:$N^2$)-bis[bis(triphenylphosphine)rhodium (I)]dinitrate and $\mu$-3-carbopentazane-$N^1$,$N^4$:$N^2$, $N^5$-bis[bis(triphenylphosphine)rhodium (I)]dinitrate, which are homogenous hydrogenation catalysts and their application in the hydrogenation of the exocyclic methylene group of acid addition salts of 6-demethyl-6-deoxy-6-methylene-5-hydroxytetracyline (methacycline) to prepare $\alpha$-6-deoxy-5-hydroxy-tetracycline (doxycycline).

Doxycycline is a wide-spectrum antibacterial agent, with widespread application in the treatment of numerous infections in humans and in animals. The hydrogenation of the exocyclic methylene group of methacycline can produce two epimers. The $\alpha$-epimer is doxycycline, whilst the $\beta$-6-epimer, called 6-epi-doxycycline, is devoid of clinical utility. Thus, it is important that the hydrogenation does not co-produce this $\beta$-6-epimer. In fact, the British Pharmacopoeia 1980 established a limt for the content of 6-epi-doxycycline in doxycycline of 2%.

In the prior art, doxycycline was first described in 1960 in U.S. Pat. No. 3,200,149. Since that time many methods have been described for the preparation, in all of which the modification of the catalytic system has been described as producing improved yields or a purer product. In the field of heterogenous catalysis, U.S. Pat. Nos. 3,444,198, 3,849,491, 3,954,862 and 4,597,904 and the report in Chemical Abstracts 86, 89476 f (1977) of Hungarian Pat. No. 12 042 have all taught improved methods for the preparation of doxycycline and its analogues.

The first use of homogenous catalysis was described in U.S. Pat. No. 4,207,258 (Italian priority 1972), wherein the catalyst was a complex of rhodium with tertiary phosphine, arsine and stibine ligands. U.S. Pat. No. 3,962,331 extended the above process to the simultaneous reductive dehalogenation and hydrogenation of an 11a-halomethacycline. French Pat. No. 2,216,268 later disclosed the use of the same catalyst.

Since that time, other patents have appeared such as U.S. Pat. Nos 3,907,890, 4,001,321 and 3,962,131 all describing variations in the catalytic system and claiming improved yields and stereospecificity.

The first homogenous hydrogenation catalysts of the type of tertiary phosphine-hydrozino-rhodium complexes were described in U.S. Pat. No. 4,550,096. These were prepared by reacting a rhodium salt, specifically rhodium trichloride, with a tertiary phosphine and a hydrazine or by reacting a rhodium complex, such as tris(triphenylphosphine)chlororhodium, with a hydrazine. These complexes allowed the preparation of doxycycline, containing less than 1% of the undesired 6-epi-doxycycline, in high yield using considerably less rhodium than had been taught in the prior art.

U.S. Pat. No. 3,463,830 describes the preparation of zero valent platinum and palladium catalysts, by the reduction of these metals from oxidation state II by the ue of the reducing agent, hydrazine. The function of the hydrazine is merely as a reducing agent, and it is not incorporated into the catalyst so prepared. As will be described herein-below, the compounds of the present invention differ from those of U.S. Pat. No. 3,463,830 in that the hydrazine is incorporated into the rhodium complex as a ligand, and surprisingly the rhodium is not reduced to the zero oxidation state.

U.S. Pat. No. 3,956,177 describes compositions useful as hydroformylation catalysts, prepared by contacting an organorhodium halide with a hydrazine and a phosphorous-containing adjuvant, to form an intimate mixture thereof. It is stated in the specification that these catalysts are not compounds formed by the components of the mixture, and they are not described as useful for the hydrogenation of carbon/carbon double bonds, but as catalysts for hydroformylation reactions.

The copending U.S. application No. 50,931, based on the Portuguese Application for a Patent of Addition to Portuguese Patent No. 74.303, describes the preparation of several members of the group of triphenylphosphine-hydrazino-chlororhodium complexes in a pure state, having well defined formulae, and their application in the preparation of doxycycline.

When using rhodium trinitrate instead of rhodium trichloride in the process described in U.S. Pat. No. 4,550,096, it was found surprising that the formation of the complexes was generally different from that of the complexes obtained from rhodium trichloride. The catalytic system thus formed comprises rhodium complexes having different formulae and is not analogous to the series containing chloride as the anionic ligand.

It has been found that, especially on an industrial scale, the minimum effective quantity of catalyst needed to hydrogenate a methyacycline acid addition salt to prepare doxycycline could be further reduced by about one half, in relation to the quantity necessary when rhodium trichloride was used to prepare the catalytic system described in U.S. Pat. No. 4,550,096. This is an extremely important advantage because of the very high cost of rhodium.

Therefore, the present invention comprises a new rhodium homogeneous hydrogenation catalytic system with high stereospecificity, as well as new isolated complexes of fully elucidated formulae.

The new catalytic system can be prepared by reacting one mole of rhodium trinitrate, as the dihydrate, with one to two moles, or even with an excess, of a suitable tertiary phosphine, and between one and two moles, or an excess, of a suitable hydrazine, in a suitable solvent, at a temperature comprised between room temperature and the reflux temperature of the medium, preferably under an inert atmosphere. The expression "suitable" denotes those compounds which, when forming the complex, do not interfere with its catalytic activity.

Not all tertiary phosphines are suitable but simple experimentation will show which can be used satisfactorily. Triphenylphosphine and its para-chloro and para-fluoro derivatives, for example, yield efficient complexes, whilst other derivatives of triphenylphosphine, such as the ortho-methoxy or para-dimethylamino, give inefficient complexes. Additionally, ethyldiphenylphosphine and benzyl-diphenylphosphine give catalytically inoperative complexes for the preparationof doxycycline.

The suitable hydrazines are of the formula $R_1R_2N.NR_3R_4$, wherein $R_1$ is phenyl, benzenesulphonyl, lower alkyl or hydrogen and $R_2$, $R_3$ and $R_4$ are lower alkyl or hydrogen, with the proviso that when $R_1$ is phenyl or benzenesulphonyl, $R_2$, $R_3$ and $R_4$ are hydrogen. The preferred hydrazine is hydrazine itself and its hydrate.

The usual solvents are aliphatic alcohols containing one to four carbon atoms, the preferred solvent being methanol.

It has been found that the catalyst prepared "in situ" in the molar proportion of one mole of rhodium trinitrate dihydrate, one mole of triphenylphosphine and one mole of hydrazine does not have a satisfactory activity in the hydrogenation of methacycline p-toluenesulphonate to prepare doxycycline ($\alpha$-epimer), in that the stereospecificity is reduced ($7\alpha/1\beta$), whilst a molar proportion 1:1:2 ensures a pronounced stereospecificity ($24\alpha/1\beta$). A molar proportion of 1:1:3, results in an even higher stereospecificity ($45\alpha/1\beta$).

Generally, the preparation of the catalytic system of the present invention should be carried out using in total, at least three moles of ligands, of which the tertiary phosphine must be present in one to two moles, for each mole of rhodium nitrate.

After extensive studies, it has been possible to isolate certain catalysts of the invention, and to elucidate their structural formulae.

Thus, in particular, the invention provides a process for the preparation of new rhodium complexes, which are homogeneous hydrogenation catalysts, having well-defined structures, comprising the step of reacting rhodium trinitrate dihydrate, triphenylphosphine and hydrazine, characterised by the fact that the reaction is carried out in degassed methanol under an inert atmosphere, to yield complexes of the formulae I and II:

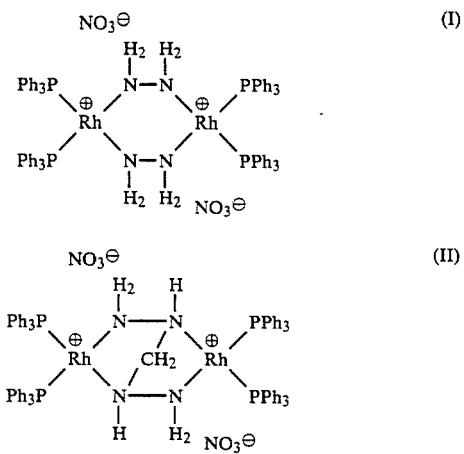

wherein Ph is phenyl, when one mole of rhodium trinitrate dihydrate is reacted with an excess of triphenylphosphine, preferably at least three and a half moles, and at least one mole of hydrazine, wherein the complex of formula I is predominant with short reaction times and the complex of formula II is predominant with longer reaction times.

When the process of U.S. Pat. No. 4,550,096 is carried out in accordance with the present invention, that is using rhodium trinitrate, a mixture of products can be obtaind. However individual complexes can in general be obtained by carrying out the process under an inert atmosphere with complete exclusion of air and in degassed reaction media, followed by drying under an inert atmosphere or in vacuum. After eventual purification, the complexes obtained are of uniform composition and well defined formulae, being novel compounds, never previously described.

Thus, the present invention includes within its scope the preparation of novel homogeneous catalysts, that is, complexes of rhodium with triphenylphosphine and hydrazine in their pure states, having well defined structures and a highly stereospecific and regioselective catalytic activity, which can be employed in minute amounts in the hydrogenation of methacycline to furnish $\alpha$-6-deoxy-5-hydroxytetracycline in high yields, near to stoichiometric.

According to the present invention, by reacting, under an inert atmosphere, one mole of rhodium trinitrate dihydrate, an excess of triphenylphosphine, preferably at least three and a half moles, and at least one mole of hydrazine in degassed methanol, a complex of formula I can be isolated after a short reaction time, typically of the order of one hour, and a complex of formula II can be isolated after longer reaction times, typically one to two days at room temperature. Alternatively, the reaction mixture can be refluxed overnight, followed by cooling and standing at room temperature.

The structures of the compounds of formulae I and II were established by X-ray crystallography.

The catalysts when prepared according to the conditions described above, are fully active in the hydrogenation of methacycline to doxycycline. Furthermore, it is not necessary to add excess triphenylphosphine to ensure a high yield of the required $\alpha$-epimer.

The conditions of preparation of the catlysts of the present invention are clearly illustrated in Examples 1 and 2. The rhodium trinitrate dihydrate and hydrazine can be reacted in the molecular proportion corresponding to their respective formulae, but it is advantageous to use hydrazine in excess so as to obtain the maximum yield in relation to the expensive rhodium salt.

The hydrazine can be used as either the anhydrous base or as the monohydrate. It has been verified that the anhydrous base allows shorter reaction times.

The triphenylphosphine is present in excess, preferably in a molar ratio of 3.5 in comparison with the rhodium present. This excess can be increased without any noticeable change in the products formed.

To achieve the best results in preparing the compounds of formulae I and II, rhodium trinitrate dihydrate (1 mole), triphenylphosphine (3.5 moles) and hydrazine (3 moles) are mixed in degassed methanol under a nitrogen atmosphere. After stirring for 1 hour, a yellow crystalline solid of formula I is isolated by filtration and dried under vacuum. If the reaction mixture is stirred for a longer period, that is one to two days, an orange crystalline solid of formula II can be isolated by filtration and dried under vacuum. Alternatively, the reaction mixture can be refluxed overnight, followed by cooling and standing at room temperature.

The complexes of formulae I and II are stable for at least one month, providing they are stored under nitrogen at reduced temperatures. After this period, slightly diminished catalytic activity is sometimes observed. Therefore, these complexes should be in preference freshly prepared to obtain the best hydrogenation results. Alternatively, they can be prepared immediately prior to use and then employed without isolation, by addition to the hydrogenation reaction mixture, whreby equally good results can be achieved.

As already indicated, the hydrazino-rhodium complexes of the present invention are efficient homogeneous stereospecific hydrogenation catalysts, in general.

The present invention however, has been specifically directed to their application in the hydrogenation of the exocyclic methylene group of 6-demethyl-6-deoxy-6-methylene-5-hydroxytetracycline present in the hydrogenation reaction mixture as an acid addition salt, so as to yield α-6-deoxy-5-hydroxytetracycline in a near stoichiometric yield.

The starting methacycline can be prepared by any of the known processes, such as that described in U.S. Pat. No. 3,849,491, but should not contain impurities which may act as a catalyst inhibitor.

Although the new complexes will catalyse the hydrogenation of methacycline base, the rate is so slow that the time of hydrogenation does not permit the yields obtained when using an acid addition salt.

The rate of hydrogenation increases with the temperature. Temperatures from ambient to 95° C. can be used, but to achieve the best yields and stereospecificity, the optimum reaction temperature range is between 85° C. and about 90° C. At 95° C. the yields are slightly lower than for instance at 88° C. Below 85° C., the catalytic system starts to be sensitive to the eventual presence of certain trace impurities which may interfere with the rate of hydrogenation.

In the context of the hydrogenation of methacycline acid addition salts for the preparation of doxycycline, the present invention has several advantages when the temperature range during hydrogenation is 85° C. to about 90° C.

First, there is no necessity for extremely high hydrogen pressures. It has been found that from 1 kg/cm$^2$ to 10 kg/cm$^2$ will ensure complete conversion of the methacycline substrate in between 6 to about 10 hours. Typically, the hydrogenation is carried out at 88°–89° C. at a hydrogen pressure of 7 to 9 kg/cm$^2$ and is complete after 6½ to 7 hours.

The painstaking preparation of the catalysts under strictly inert conditions can be alleviated by their preparation in degassed methanol under a nitrogen atmosphere immediately prior to use, followed by addition to the hydrogenation reaction mixture, after which the actual hydrogenation is carried out.

The transformation of the methacycline acid addition salt into doxycycline using the catalysts of the present invention, gives a purity above 95% in the reaction mixture, as analysed by high performance liquid chromatography (h.p.l.c.).

Additionally, the use of a rhodium to substrate ratio of 0.0002 by weight in laboratory scale experiments allows complete conversion within about 6½ to 7 hours. On an industrial scale, a rhodium to substrate ratio of 0.00015 by weight is sufficient to permit complete conversion of the substrate within about 7 to 8 hours.

To ascertain the efficiency of the catalyst of formula II, large sized crystals were prepared, as described in Example 2. One of the crystals so obtained was used as catalyst in the hydrogenation of methacycline hydrochloride. The purity of the conversion of methacycline hydrochloride into doxycycline was 99.2% and the β-epimer was formed in 0.6% as determined by high performance liquid chromatography.

In relation to U.S. Pat. No. 4,550,096, the most striking observation concerning the present invention lies in the fact that when the catalysts are prepared, dried, and stored under a strictly inert atmosphere, the catalysts exert full activity without the necessity of adding an excess of tertiary phosphine, more specifically triphenylphosphine, to the hydrogenation mixture so as to achieve the best yields.

An explanation for this is that the catalysts prepared according to the process of U.S. Pat. No. 4,550,096 were believed to be stable and, in fact, they exerted a very high catalytic activity even when stored for long periods because they were subsequently employed in presence of a controlled excess of a tertiary phosphine. It is now believed that the catalysts prepared according to the process described in U.S. Pat. No. 4,550,096 oxidise slowly, but the presence of the excess tertiary phosphine in the hydrogenation reaction mixture, allowed substitution of the oxidised part of the tertiary phosphine, thereby regenerating the original catalytic system.

As has been previously mentioned, the catalyst is most conveniently prepared and used without isolation. Hydrazine (1 to 4 moles) is added with stirring to rhodium trinitrate dihydrate (1 mole) and triphenylphosphine (3.5 moles) in degassed methanol in a glass vessel, under a nitrogen atmosphere. Upon addition of the hydrazine, the initial red colour turns to yellow. It is stirred for between a few minutes and two hours, and then transferred to the pressure reaction vessel containing the methacycline acid addition salt in methanol at 50° C., under nitrogen.

Subsequently, the reaction vessel is purged again with nitrogen, then with hydrogen, finally being pressurised to 8 kg/cm$^2$ with hydrogen. The reaction mixture is heated to 88° C. under stirring, and the temperature maintained at 88° C.±2° C. until the velocity of consumption of hydrogen slows down drastically, which occurs after about 6 to 7 hours. At this time, the reaction mixture contains nearly exclusively α-6-deoxy-5-hydroxytetracycline.

As is known in the art, the rate of the hydrogenation of methacycline is increased under acid conditions. Therefore, addition of an acid, preferably the same acid present in the acid addition salt of the substrate will assure high yields and purity. The amount of extraneous acid is not critical. It can be between one mole per mole of rhodium present, and up to about one mole per mole of the substrate to be hydrogenated. When the extraneous acid is not nitric acid, it is possible that the nitrate counter-ions of the compounds of formulae I and II, could be exchanged by the anion of the added acid.

The purity of the reaction mixture thus obtained is such that the doxycycline can be directly crystallised from the reaction mixture by adding excess p-toluenesulphonic acid, followed by cooling, yielding doxycycline p-toluenesulphonate with a purity superior to 99%.

Finally the new catalytic system can also be employed in the simultaneous dehalogenation of the 11a-chloro-substitutent and stereospecific hydrogenation of the 6-methylene group of 11a-chloro-methyacycline with good yields.

The following examples serve to illustrate the present invention, without in any way limiting the scope thereof.

EXAMPLES

1. Preparation of di(μ-hydrazine-N$^1$:N$^2$)-bis[bis(triphenylphosphine) rhodium (I)]dinitrate

Rhodium trinitrate dihydrate (0.26 g; 0.85 mmoles) and triphenylphosphine (0.75 g; 2.86 mmoles) were placed in a two necked round bottom flask. They were stirred under vacuum for 30 minutes. Dry, degassed methanol (50 ml) was added, followed by 15 minutes stirring, to give an orange solution. The addition of hydrazine in methanol (7 ml of a 12.85 mg/ml solution; 2.81 mmoles) produced a bright yellow suspension which was stirred for a further 30 minutes. This yellow crystalline material was filtered off and dried under vacuum.

A number of attempts were made to select crystals for X-ray crystallographic analysis, but almost all samples selected were twinned. Eventually a small fragment from a larger elongated parallelopiped was found which was single. This was used for collection of X-ray data on an Enraf-Nonius CAD4 diffractometer, following standard procedures. Details of the crystal data and structure determination are as follows:

Crystal data: $[C_{72}H_{68}N_4P_4Rh_2].[NO_3]_2.(CH_3OH)_2$, Mw=1507.19, monoclinic, space group C2/c with a=24.431(3)Å, b=13.480(2)Å, c=22.102(3)Å, $\beta$=94.27(2)°, V=7258.8 Å$^3$, Z=4, Dc=1.38 g.cm$^{-3}$, $\mu$(Mo-K$\alpha$)=5.8 cm$^{-1}$.

Data collection: Intensity data was collected in the range $1.5° \leq \theta \leq 21.0°$ and, a total of 4220 intensities were measured, of which 3883 were unique and 2336 were observed [I>3$\sigma$(I)], and used in the analysis.

The structure was solved via the heavy-atom method, and refined by full matrix least squares. The phenyl groups in the phosphines were treated as rigid bodies. The current R value is 0.13, with all atoms refined in the isotropic approximation.

The structure contains a centrosymmetric dimeric cation in which two (PPH$_3$)$_2$Rh units are linked together by two bridging hydrazine molecules to produce a central Rh$_2$N$_4$ ring. By symmetry, this therefore has a chair conformation. The Rh-P and Rh-N distances are normal.

2. Preparation of $\mu$-3-carbopentazane-N$^1$,N$^4$:N$^2$,N$^5$-bis[bis(triphenylphosphine)rhodium (I)]dinitrate Rhodium trinitrate dihydrate (0.36 g; 1.18 moles) and triphenylphosphine (1.12 g; 4.27 mmoles) were placed in a two necked round bottom flask. They were stirred under vacuum for 30 minutes and then under an atmosphere of nitrogen for 15 minutes. Dry, degassed methanol (100 ml) was added and the mixture stirred for 15 minutes. Hydrazine in methanol (10 ml of a 10.77 mg/ml solution; 3.36 mmoles) was added and the reaction mixture was refluxed overnight. The orange solution was filtered and stood at room temperature for 3 days, during which time large orange crystals were deposited. These were filtered off and dried under vacuum.

When the reaction was repeated using rhodium trinitrate dihydrate (0.28 g; 0.91 mmoles), triphenylphosphine (0.80 g; 3.05 mmoles), hydrazine in methanol (8 ml of a 10.77 mg/ml solution; 2.69 mmoles) in methanol (60 ml) and stirring for two hours, clarification by filtration and standing for 5 days, similar orange crystals were obtained.

A single crystal of average diameter 0.4 mm was sealed under argon in a thin walled glass capillary. Unit cel and intensity data were obtained using an Enraf-Nonius CAD4 diffractometer, following standard procedures. Details of the experimental features are as follows:

Crystal data: $[C_{73}H_{68}N_4P_4Rh_2].[NO_3]_2.(CH_3OH)_n$, n$\simeq$0.5, Mw=1455.10 (excluding the methanol), monoclinic, space group P2$_1$/n, a=22.269(3)Å, b=23.311(3)Å, c=13.838(2)Å, $\beta$=100.51(2)°, V=7063.0 Å$^3$, Z=2, Dc=1.37 g.cm$^{-3}$, $\mu$(Mo-K$\alpha$)=5.38 cm$^{-1}$.

Data collection: Data were recovered for $1.5° \leq \theta \leq 23°$ at room temperature, 291° K. and corrected for absorption empirically. 9820 intensities were measured, of which 7551 were observed [I>1.5$\sigma$(I)], and used in the analysis.

The structure was solved via the heavy atom method and refined by full matrix least squares. All non-hydrogen atoms were refined with anisotropic thermal parameters, the phenyl groups being treated as rigid bodies. Hydrogen atoms on the phenyl groups were located experimentally, but for convenience were included and refined in idealised positions. Hydrogens on the bridging ligands were experimentally located and freely refined with isotropic thermal parameters. The final R value is 0.05 with 707 parameters.

The complex is shown to contain a dimeric cation in which two (Ph3P)2Rh units were linked together by a 3-carbopentazane unit, as shown in II:

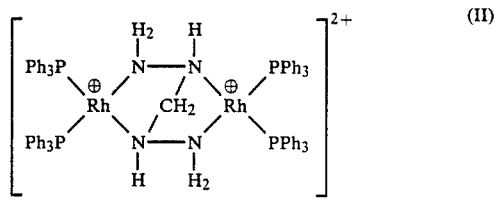

The presence of the methylene bridge infers a boat conformation on the central Rh$_2$N$_4$ ring, with the bridge linking the "prow and stern" positions. The nitrate ions are well separated from the cation and do not appear to be forming any unusually close contacts. Indeed, one of them seems to occupy a cavity of such size that some positional disorder can occur, and it is also possible that a further cavity in the structure may be partially occupied by methanol of crystallisation.

In a repeat experiment, organge crystals of very similar morphology were obtained, but which appeared to suffer loss of crystallinity on removal from the methanol. On crystallographic examination, these were found to contain considerably more methanol of crystallisation, but the structure of the cation was found to be analogous to that in the first complex.

3. Hydrogenation of methacycline p-toluenesulphonate using a non-isolated catalyst To a suspension of methacycline p-toluenesulphonate (9.50 g; 15.46 mmoles) in methanol (40 ml) was added a solution of rhodium trinitrate dihydrate (5.76 mg; 0.02 mmoles), triphenylphosphine (70.0 mg; 0.27 mmoles) and hydrazine hydrate (0.71 ml of a 0.0814M solution of hydrazine in methanol; 0.058 mmoles) in methanol (20 ml). This mixture was hydrogenated at a hydrogen pressure of 8 kg/cm$^2$ for 6½ hours at 88° C. Thereafter, p-toluenesulphonic acid (3.3 g) was added to precipitate the doxycycline p-toluenesulphonate, which weighed 8.64 g, and had a purity of 98.72% by h.p.l.c.

4. Hydrogenation of methacycline hydrochloride using a non-isolated catalyst

To a suspension of methacycline hydrochloride (7.38 g; 15.41 mmoles) in methanol (40 ml) was added a solution of rhodium trinitrate dihydrate (5.90 mg; 0.02 mmoles), triphenylphosphine (19.1 mg; 0.07 mmoles) and hydrazine hydrate (0.47 ml of a 0.0814M solution of hydrazine in metahnol; 0.038 mmoles) in methanol (20 ml). This mixture was hydrogenated at a hydrogen pressure of 8 kg/cm² for 6½ hours at 89° C. Thereafter, p-toluenesulphonic acid (3.3 g) was added to precipitate the doxycycline p-toluenesulphonate, which weighed 9.08 g, and had a purity of 99.54% by h.p.l.c.

5. Hydrogenation of methacycline using μ-3-carbopentazane-N¹, N⁴:N², N⁵-bis [bis(triphenylphosphine)rhodium (I)]dinitrate 6-Demethyl-6-deoxy-6-methylene-5-hydroxytetracycline hydrochloride (10.38 g; 21.7 mmoles) was suspended in methanol (84.5 ml) in a stainless steel high pressure reaction vessel and μ-3-carbopentazane-N¹, N⁴:N²,N⁵-bis [bis(triphenylphosphine)rhodium (I)]dinitrate (25 mg; 0.017 mmoles; 0.034 mmoles of rhodium) was added under an atmosphere of nitrogen. The vessel was purged with nitrogen, then with hydrogen and pressurised to 8 kg/cm² with hydrogen. The reaction mixture was heated to 88° C. for 6½ hours with efficient stirring. The hydrogen was then discharged and p-toluenesulphonic acid (4.65 g; 24.2 mmoles) added under efficient stirring. The stirring was continued for 2 hours whereafter the resulting precipitate was filtered, washed with a small quantity of methanol and dried at 35° C.

The yield of α-6-deoxy-5-hydroxytetracycline p-toluenesulphonate was 12.0 g, or 89.8% of theoretical. By h.p.l.c. it was shown to be 99.2% pure.

We claim:

1. A process for the preparation of a rhodium-containing homogeneous hydrogenation catalytic system, which comprises reacting a rhodium salt, a hydrazine and a tertiary phosphine in a solvent under otherwise inert conditions, characterized in that the rhodium salt is rhodium trinitrate.

2. A process for the preparation of a new rhodium homogeneous hydrogenation catalytic system, according to claim 1, wherein the tertiary phosphine is triphenylphosphine, the hydrazine is hydrazine itself or its hydrate, and the solvent is an aliphatic alcohol containing one to four carbon atoms.

3. A process for the preparation of a new rhodium-homogeneous hydrogenation catalytic system, according to claim 2, wherein the molar proportion of the reagents calculated for each mole of rhodium trinitrate dihydrate is from one to four moles of triphenylphosphine, one to four moles of hydrazine hydrate, and the solvent is degassed methanol.

4. A process according to claim 1, wherein the catalytic system is prepared separately, under an inert atmosphere, by reacting the reagents at a temperature comprised between room temperature and the reflux temperature of the medium, and added under a nitrogen atmosphere, to the reaction mixture of the substrate to be hydrogenated in an adequate solvent.

5. A process according to claim 1, wherein the catalytic system is prepared "in situ" in the hydrogenation reaction mixture.

6. A process according to claim 1 for the preparation of new rhodium complexes, which are homogeneous hydrogenation catalysts, having well-defined structures, comprising the step of reacting rhodium trinitrate dihydrate, triphenylphosphine and hydrazine, and characterised by the fact that the reaction is carried out in degassed methanol under an inert atmosphere, to yield complexes of the formulae I and II:

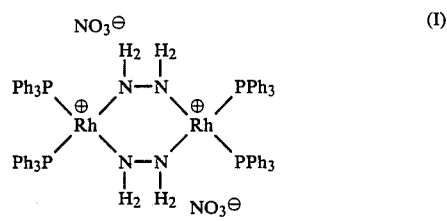

wherein Ph is phenyl, when one mole of rhodium trinitrate dihydrate is reacted with an excess of triphenylphosphine, and at least one mole of hydrazine, wherein the complex of formula I is predominant with short reaction times and the complex of formula II is predominant with longer reaction times.

7. A process according to claim 6, characterised by the fact that the inert atmosphere is nitrogen.

8. A process according to claim 1, characterised by the fact that the hydrazine is the anhydrous base or the monohydrate.

9. The compound di(μ-hydrazine-N¹:N²)-bis[bis(triphenylphosphine)rhodium (I)]dinitrate.

10. The compound μ-3-carbopentazane-N¹,N⁴:N²,N⁵-bis[bis(triphenylphosphine)rhodium (I)]dinitrate.

11. A process according to claim 4 wherein the solvent is methanol.

12. A process according to claim 6, characterized by the fact that the hydrazine is the anhydrous base or the monohydrate.

13. A process according to claim 6, characterized by the fact that the rhodium trinitrate dihydrate is reacted with at least 3½ moles of triphenylphosphine.

* * * * *

UNITED STATES PATENT AND TRADEMARK OFFICE
CERTIFICATE OF CORRECTION

PATENT NO. : 4,911,865

DATED : March 27, 1990

INVENTOR(S) : William Heggie, Philip R. Page, Ivan Villax, Indira Ghatak and Michael Hursthouse It is certified that error appears in the above-identified patent and that said Letters Patent is hereby corrected as shown below:

Column 1, line 28, for "limt" read --limit--; line 54, for "hydrozino" read --hydrazino--; and line 67, for "ue" read --use--.

Column 2, line 34, for "methyacycline" read --methacycline--; and line 63, for "preparationof" read --preparation of--.

Column 3, line 63, for "obtaind" read --obtained--.

Column 4, line 30, for "catlysts" read --catalysts--; and line 64, for "whreby" read --whereby--.

Column 6, line 56, for "methyacycline" read --methacycline--.

Column 7, line 31, for "(PPH$_3$)$_2$Rh" read --(PPh$_3$)$_2$Rh--; and line 61, for "cel" read --cell--.

Column 8, in the structure at lines 21-29, delete both appearances of " ⊕ "; and line 67, for "metahnol" read --methanol--.

UNITED STATES PATENT AND TRADEMARK OFFICE
CERTIFICATE OF CORRECTION

PATENT NO. : 4,911,865

DATED : March 27, 1990

INVENTOR(S) : William Heggie, Philip R. Page, Ivan Villax, Indira Ghatak and Michael Hursthouse It is certified that error appears in the above-identified patent and that said Letters Patent is hereby corrected as shown below:

Column 10, between the formula at lines 15-23 and the text at line 25 read

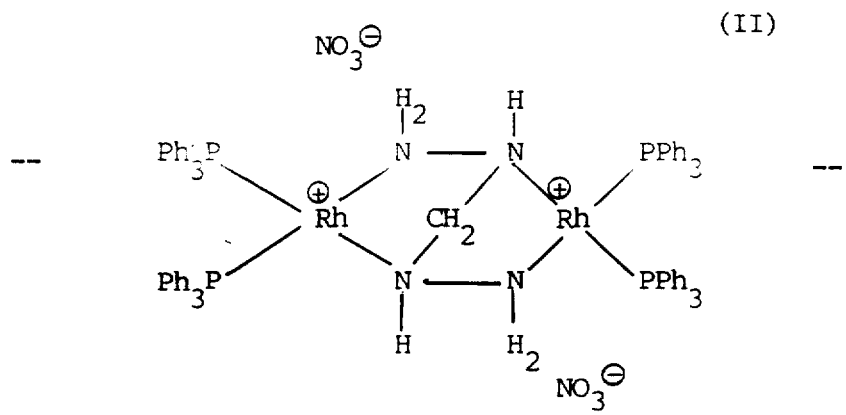

Signed and Sealed this

Twenty-ninth Day of October, 1991

Attest:

HARRY F. MANBECK, JR.

Attesting Officer

Commissioner of Patents and Trademarks

UNITED STATES PATENT AND TRADEMARK OFFICE
CERTIFICATE OF CORRECTION

PATENT NO. : 4,911,865
DATED : March 27, 1990
INVENTOR(S) : William Heggie, et al.

It is certified that error appears in the above-indentified patent and that said Letters Patent is hereby corrected as shown below:

Column 8, line 19, for "(Ph3P)2Rh" should read --$(Ph_3P)_2Rh$--

Signed and Sealed this

Sixth Day of September, 1994

Attest:

BRUCE LEHMAN

*Attesting Officer*  *Commissioner of Patents and Trademarks*